US009282172B2

(12) United States Patent
Gammon et al.

(10) Patent No.: US 9,282,172 B2
(45) Date of Patent: Mar. 8, 2016

(54) SYSTEM AND METHOD FOR RELAYING DATA BASED ON A MODIFIED RELIABLE TRANSPORT PROTOCOL

(71) Applicant: RESEARCH IN MOTION LIMITED, Waterloo (CA)

(72) Inventors: Scott Peter Gammon, Waterloo (CA); Ajay Puri, Toronto (CA)

(73) Assignee: BLACKBERRY LIMITED, Waterloo (CA)

( * ) Notice: Subject to any disclaimer, the term of this patent is extended or adjusted under 35 U.S.C. 154(b) by 188 days.

(21) Appl. No.: 13/891,694

(22) Filed: May 10, 2013

(65) Prior Publication Data

US 2014/0334502 A1 Nov. 13, 2014

(51) Int. Cl.
*H04J 3/16* (2006.01)
*H04L 29/06* (2006.01)

(52) U.S. Cl.
CPC .................................... *H04L 69/08* (2013.01)

(58) Field of Classification Search
CPC ................................................ H04L 29/06068
USPC ........................................................ 370/466
See application file for complete search history.

(56) References Cited

U.S. PATENT DOCUMENTS

| 7,502,860 | B1 | 3/2009 | Champagne | |
|---|---|---|---|---|
| 7,912,911 | B2 | 3/2011 | Way et al. | |
| 2003/0123481 | A1* | 7/2003 | Neale et al. | 370/466 |
| 2005/0249230 | A1 | 11/2005 | Bennett et al. | |
| 2005/0286519 | A1* | 12/2005 | Ravikumar et al. | 370/389 |
| 2006/0256817 | A1* | 11/2006 | Durst | 370/466 |
| 2008/0075072 | A1* | 3/2008 | Cao | H04L 1/1809 370/389 |
| 2012/0072570 | A1 | 3/2012 | Jenkins et al. | |

OTHER PUBLICATIONS

Chris Ross Ed—Anonymous: "The Future of SCPS as an Acceleration Solution", Military Communications Conference, 2007. MILCOM 2007. IEEE, IEEE, Piscataway, NJ, USA, Oct. 29, 2007, pp. 1-7, XP031232381.
Anna Brunstrbm et al: "Enhancing TCP Performance by Allowing Controlled Loss", Proceedings SSGRR 2000 Computer & EBusiness Conference, Jul. 31, 2000, XP055073922.
Philopoulos S etal: II Proxy-based connection-splitting architectures for improving TCP performance over satellite channels, IEEE Canadian Conference on Electrical and Computer Engineering. CCECE 2002. Winnipeg, Manitoba, Canada, May 12-15, 2002; [Canadian Conference on Electrical and Computer Engineering], New York, NY : IEEE, US.

(Continued)

*Primary Examiner* — Christopher R Crompton
(74) *Attorney, Agent, or Firm* — Perry + Currier Inc.

(57) ABSTRACT

A system for relaying data based on a modified reliable transport protocol is provided. According to an aspect, a relay can receive a data packet sent in accordance with a reliable transport protocol. The relay processes the received packet in accordance with modified reliable protocol and relays the received packet. The modifications can be based on alterations to reliability mechanisms which improve communication characteristics of the protocol for real time communications and other time sensitive communications. The modified protocol is nevertheless compatible with the original reliable protocol so that relay can communicate, using the modified protocol with any network component using the unmodified protocol.

18 Claims, 4 Drawing Sheets

(56) References Cited

OTHER PUBLICATIONS

Ccsds Secretariat: Ccsds Recommended Standard for SCPS Transport Protocol (SCPS-TP) In: "Recommendation for Space Data System Standards", Oct. 31, 2006, National Aeronautics and Space Administration.

European Patent Application No. 13167367.5 Extended Search Report dated Aug. 16, 2013.

\* cited by examiner

SYSTEM AND METHOD FOR RELAYING DATA BASED ON A MODIFIED RELIABLE TRANSPORT PROTOCOL

FIELD OF INVENTION

The present invention relates generally to network processes, and more particularly to network processes for relay of data.

BACKGROUND

Network communications are based on protocols. Protocols allow different network components such as devices and servers to communicate in a harmonious manner. A suite of protocols can be used to define different functionality needed to communicate data from one network component to another. Some protocols can be tailored to achieve desired characteristics for data communications. For example, reliable protocols can implement reliability mechanisms that increase the reliability of the data communications. Other protocols may be best-effort and thus unreliable. When communicating through firewalls, not all protocols may be available.

SUMMARY

According to an aspect, a method for performing on a relay is provided. The method can comprise:
receiving data communicated in accordance with a reliable transport protocol; and
processing the data in accordance with a modified reliable transport protocol.

The modified reliable transport protocol can be based on and can be compatible with the reliable protocol. The reliable protocol can include reliability mechanisms and modified reliable transport protocol can include modified reliability mechanisms. The modified reliability mechanisms can be based on the reliability mechanisms.

The receiving of data can comprise receiving a first packet and subsequently a second packet generated based on a sequence. The processing can comprise processing the second packet in accordance with the modified reliability mechanisms. The sequence can include intervening packets between the first packet and the second packet.

The processing of the second packet can include relaying the second packet prior to receiving the intervening packets. Processing the second packet can also include sending an acknowledgement of the second packet and the intervening packets. Processing the second packet can include passing up the second packet to the Application Layer prior to receiving the intervening packets.

The processing of the data can include acknowledging a number of packets periodically by sending one or more acknowledgement messages. The number of packets acknowledged can include unreceived packets. The number of packets acknowledged can be determined based on a historical rate of package reception. The number of packets acknowledged can be determined based on a characteristic of the data.

The method can further comprise relaying the second packet using an unreliable transport protocol. The unreliable transport protocol can be one of User Datagram Protocol (UDP) or Real-time Transport Protocol (RTP) over UDP. The relaying can be based on the Traversal Using Relays around NAT (TURN) protocol. The reliable transport protocol can be Transport Control Protocol (TCP).

Receiving data can further comprise receiving the intervening packets and the processing can further comprise relaying the intervening packets after relaying the second packet.

According to another aspect, a server is provided. The server can comprise:
a processor;
a network interface operably connected to the processor;
the processor configured for:
receiving data, through the network interface, the data communicated in accordance with a reliable transport protocol;
processing the data in accordance with a modified reliable transport protocol, the modified reliable transport protocol being based on and being compatible with the reliable protocol.

BRIEF DESCRIPTION OF DRAW

DETAILED DESCRIPTION

Figure 1:
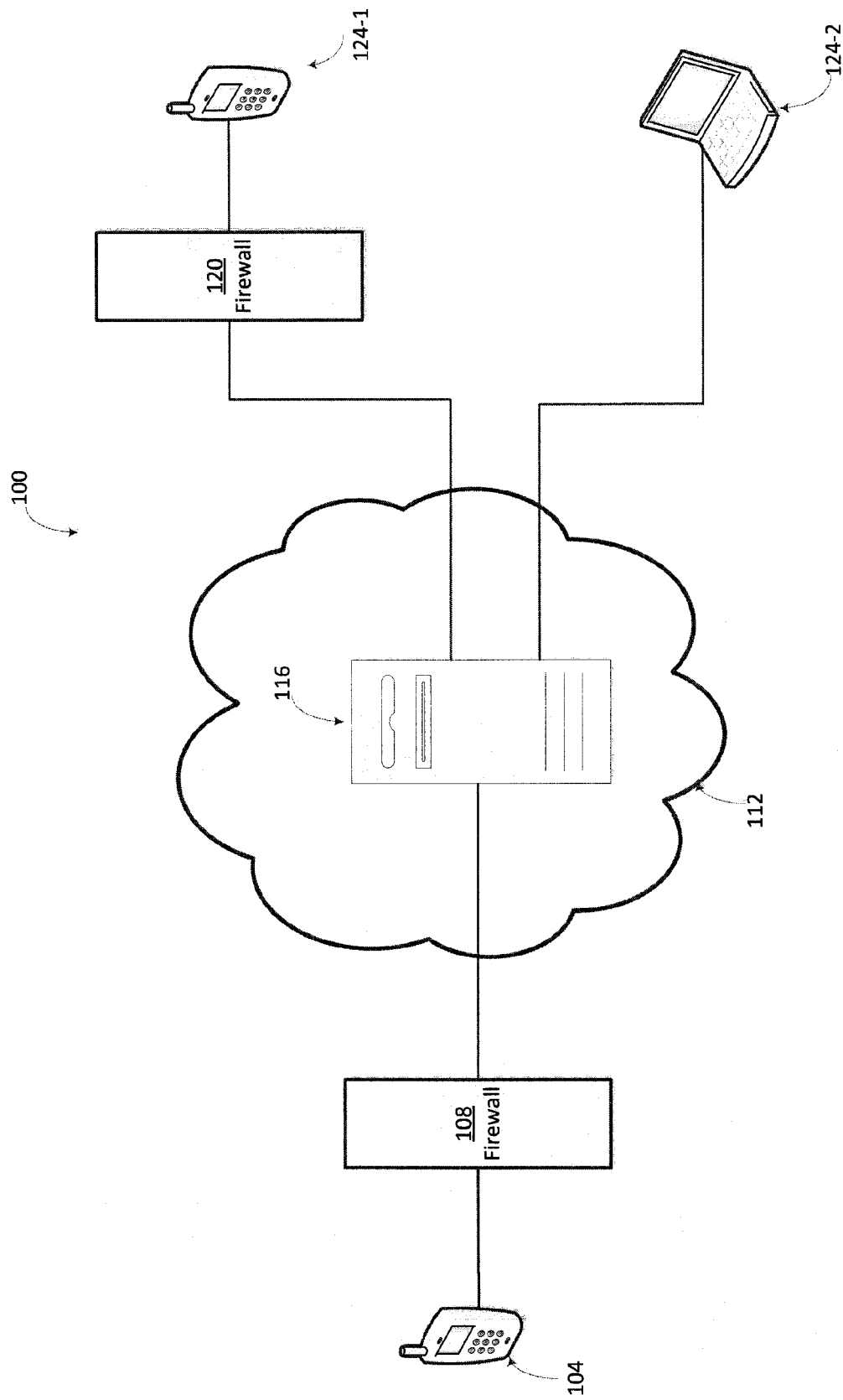
FIG. 1 shows a block diagram of an aspect of a system for relaying data based on a modified reliable transport protocol.

FIG. 1 depicts a communications system 100. System 100 includes a client 104, which in the present example is a network component based on the computing environment and functionality of a hand-held wireless client. Client 104 is not limited to a hand-held wireless client, however. Other devices are also contemplated, such as cellular telephones, smart telephones, Personal Digital Assistants ("PDAs"), media (e.g. MP3) players, laptop computers, tablet computers and the like. In other examples, client 104 can be a computing device such as a desktop computer, an embedded computer, a server or other computing device.

Client 104 is connected to network 112 through a firewall 108. Network 112 is a publicly available network such as the internet or other wide area network (WAN). Other types of public networks will now occur to a person of skill. The connection to network 112 allows client 104 to perform multi-media streaming and other data and voice communications with other network components including other devices such as peers 124 via network 112. A peer 124 can be a handheld client 124-1 or a laptop 124-2, but is not limited to such devices. Other devices are also contemplated, such as cellular telephones, smart telephones, Personal Digital Assistants ("PDAs"), media (e.g. MP3) players, laptop computers, tablet computers and the like. In other examples, a peer 124 can be a computing device such as a desktop computer, an embedded computer, a server or other computing device.

Firewall 108 is a security component that controls traffic that is reachable to client 104 through various methods, therefore assisting in the prevention of unsecure and untrusted communications from reaching client 104. Firewall 108's objective is to control the incoming and outgoing network traffic by determining whether data should be allowed through or not. Accordingly, firewall 108 attempts to reduce unsecure and untrusted communications and/or peers 124 that can reach client 104. Thus, client 104 is typically referred to as being behind firewall 108. Firewall 108 can be implemented in hardware or software.

Firewalls often have network address translation (NAT) functionality, and the network components protected behind a firewall commonly have network addresses that are not visible to peers 124 trying to access client 104 through network 112. Accordingly, firewalls often have functionality to hide the true network address of protected network components. Hiding the addresses of protected network components has become an increasingly important defense against unsecure and untrusted access to a network component behind a firewall. Accordingly, when client 104 is behind the firewall 108, only firewall 108 and other network elements also behind firewall 108 can access client 104 directly through its network address. A device or a network element that is outside the firewall 108's protection, such as those connected to network 112 would need to send data to firewall 108. Firewall 108, upon receiving the data intended for client 104, can map the address the communications is received at, to the network address of the client 104 and send the communications to the client 104. Various methods can be used to effect the address mapping such as overloading, overlapping and others that will now occur to a person of skill in the art.

Another functionality of firewall 108 is to filter the types of communications protocols that can be used to access devices and network elements behind the firewall. A communications protocol is a system of message formats and rules for exchanging communications between network components connected to a network such as network 112. For example, communications protocols define the syntax, semantics, and synchronization of communications that is to take place on network 112, as well as proper addressing for components connected to the network. Accordingly, communications protocols work in harmony to enable transport of data between network components including peers 124 and other computing devices. In order to communicate through network 112, a network component uses the communications protocols that are utilized by other components of the network 112, which in this example are based on the Internet protocol suite. Other communications protocols that can be utilized by network 112 will now occur to those of skill in the art. In the present non-limiting example, it will be assumed that firewall 108 only allows communications based on the Transport Control Protocol (TOP) to enhance the protection of network components behind the firewall.

A client 104 behind firewall 108 can exchange data packets with peers 124, some of which may also be behind firewalls, as is the case with peer 124-1 which is located behind the firewall 120. To do this, the client 104 can use methods such as "hole punching" techniques in an attempt to discover a direct communication path with a peer 124. To find a direct communications path, a path is typically identified that goes from client 104 to a peer 124 through intervening firewalls and routers, but does not traverse any relays. Direct communications path discovery techniques can fail for numerous reasons. For example, if both hosts are behind NATs that are not well behaved, a direct communications path may not be found. Alternatively, communications using certain communications protocols can also be prevented by a firewall. Accordingly, a peer 124 trying to reach client 104 using one of the blocked communications protocols will also be unsuccessful in establishing a direct communications path with the client 104.

When a direct communications path cannot be found, services of an intermediate host that acts as a relay for the communications, such as relay 116 can be used. A relay typically sits in a public network such as network 112 and relays packets between the client 104 and peers 124. A relay protocol such as Traversal Using Relays around NAT (TURN) can be used which can allow a relay 116 to act as a relay for communications to and from client 104. Accordingly, client 104 can arrange for relay 116 to relay packets to and from certain peers 124 and can control aspects of how the relaying is done. A relay 116 can be implemented as hardware and/or software.

Figure 2:
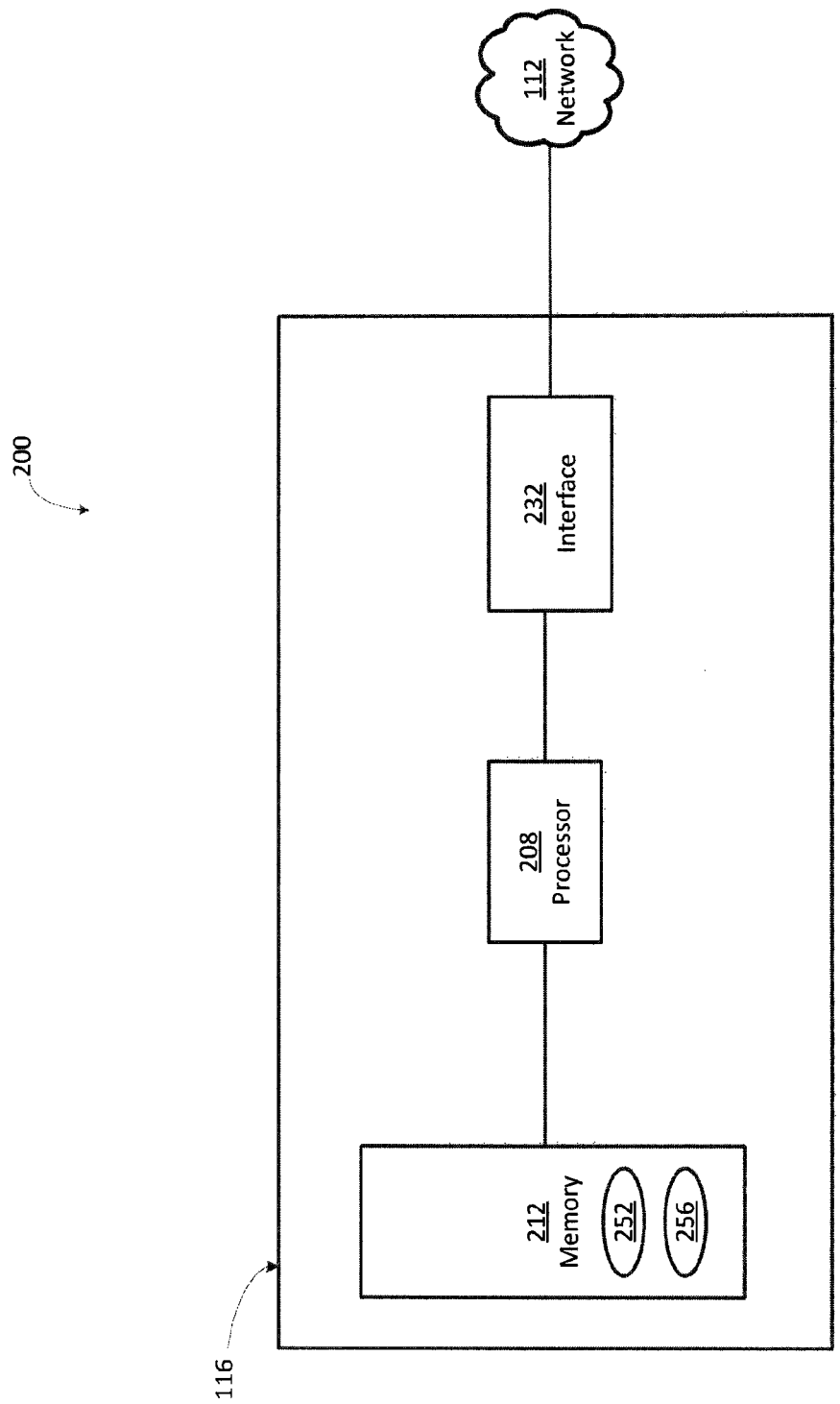
FIG. 2 shows a block diagram of an aspect of a relay for relaying data based on a modified reliable transport protocol.

Referring to FIG. 2, an example relay 116, based on a server is indicated at 200. Relay 116 includes at least one main processor 208 that controls the overall operation of the relay 116. Main processor 208 is interconnected with a computer readable storage medium such as a memory 212. Memory 212 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc memory). In the present example, memory 212 includes both volatile memory and non-volatile memory. Other types of non-transitory computer readable storage medium are also contemplated, such as compact discs (CD-ROM, CD-RW), digital video discs (DVD), secure digital (SD) cards, flash drives, and variants thereof.

Relay 116 also includes a communications interface 232 interconnected with processor 208. Communications interface 232 allows relay 116 to perform communications via network 112. Accordingly, in this non-limiting example, the communication interface 232 receives data from and sends data to network 112. In this example implementation of relay 116, the communication interface 232 is configured in accordance with an Ethernet network, although in variations interface 232 can be configured to communicate with other wired and wireless networks.

In use, a received signal or data such as data messages corresponding to a text message, an e-mail message, an audio or video chat or web page download will be processed by the communication interface 232 and input to the processor 208. The main processor 208 will then process the received signal and relay it to other network components as appropriate, through communications interface 232.

Relay 116 can also include one or more additional elements (not shown) such as input devices, output devices and other devices interconnected with main processor 208.

Relay 116 maintains, in memory 212, a plurality of computer readable instructions executable by processor 208. Such instructions can include, for example, an operating system and a variety of other applications or modules. For example, as illustrated in FIG. 2, relay 116 maintains a network module 256, and a relay module 252 (such as a server application based on the TURN protocol).

When processor 208 executes the instructions of network module 252, or a relay module 256, processor 208 is configured to perform various functions implemented by the computer readable instructions of the respective applications or modules. It is contemplated that memory 112 can store a variety of additional applications or modules, such as a server management application and others (not shown).

In general, processor 208 is configured, via the execution of network module 252, to enable relay 116 to perform communications through network 112 using the communications protocols utilized by network 112, such as TCP/IP.

Communications protocols are typically architected in a layered fashion. For example, the Internet protocol suite is a set of communications protocols used for the Internet and similar networks, and generally a popular protocol stack for wide area networks. It is commonly known as TCP/IP (Transmission Control Protocol/Internet protocol), because of the prominence of the protocols TCP and IP which it includes.

Internet protocol suite typically comprises the four layers indicated in Table 1. At this point it will occur to a person of skill that other protocol suites exist with different layering architectures, and these other protocols can be implemented by network module 256 in place of or in addition to the four layer Internet protocol suite based on the requirements of communications with network 112.

TABLE 1

Layers of the communications protocol TCP/IP

Application Layer
Transport Layer
Internet Layer
Link Layer

Referring to Table 1, the Link Layer defines protocols that describe the network topology and interfaces needed for a network component to access a physical network such as an Ethernet network. Accordingly, when data arrives intended for a specific network component such as relay 116, it is received from the Ethernet by the Link Layer and passed up to the Internet Layer. Conversely, data to be sent by relay 116 to other network components is received by the Link Layer from the Internet Layer and transmitted through the Ethernet using the communications interface 232.

The Internet Layer is responsible for enabling the sending and receiving of data from a network component. A commonly used protocol for the internet layer is the Internet Protocol (IP). In order to facilitate a network component sending or receiving data using a network 112, IP implements an addressing function. IP addressing entails the assignment of IP addresses and associated parameters to network components' network interfaces such as interface 232. Accordingly, data to be transmitted by the network component is received from the Transport Layer, appropriately addressed by adding the IP address of the intended destination component and passed down to the Link Layer to be placed on the physical network. Conversely, data received by a network component through the Link Layer is processed to remove the IP addressing related parameters and passed up to the Transport Layer.

The Transport Layer establishes component-to-component connectivity, meaning it handles the details of data transmissions that are independent of the application data and the logistics of exchanging information for any particular specific purpose. Its responsibility includes end-to-end data transfer independent of the underlying network, along with error control, segmentation, flow control, congestion control, application addressing through port numbers and others that will now occur to a person of skill in the art.

The Transport Layer establishes a basic data communication channel that an application uses in its task-specific data exchange. End-to-end message transmission carried out by the Transport Layer can be categorized as either reliable, for example as implemented by Transmission Control Protocol (TCP), or best-effort, and thus unreliable for example as implemented by User Datagram Protocol (UDP) or Real-time Transport Protocol (RTP) which is typically built on UDP transport (RTP over UDP). It will now occur to a person of skill in the art that other transport protocols exist that are either reliable or unreliable, and such protocols are contemplated.

The Transport Layer establishes the concept of a port, a numbered construct allocated specifically to each of the communication channels an application needs. For many types of services, these port numbers have been standardized so that a network component, such as a client 104, can address specific services of another network component, such as a web server. The combination of the IP address and the port allows precise targeting of data to a specific application executing on a specific network component. This combination is referred to as a transport address.

TCP is a reliable connection-oriented transport protocol that addresses numerous reliability issues and aims to provide reliable data communications between network components. For example, TCP typically includes reliability mechanisms:

sequence mechanisms for in-order and in-sequence processing of data packets;

acknowledgement and retransmission mechanisms to reduce lost/discarded packets;

flow control mechanisms to control data transmission rates at ranges that can be processed by the receiving network component; and traffic congestion control mechanisms for achieving communications without congestion collapse where network performance can slow down by several orders of magnitude.

It will now occur to a person of skill that other reliability mechanisms can be included in a protocol and that such mechanisms are contemplated.

Sequence mechanism is provided to allow a receiving network component, namely the receiver, to reliably process received data. Accordingly, at a network component sending data, namely the sender, TCP accepts the data to be sent from the Application Layer, segments it into packets, and adds a TCP header creating a TCP segment. The data packets thus created are then passed down to the Internet Layer to be processed by IP by being encapsulated with addressing and related information. Each data packet is numbered based on a sequence mechanism such that the data packets generated are numbered based on the ordered sequence with sequence numbers such as 1, 2, 3, 4, 5 in a non-limiting simplified example. The packets are meant to be received and combined in accordance with this order and in this sequence based on the sequence mechanism. Accordingly, at the receiver, the data packets are received and combined in the same order and sequence.

As a data packet arrives at a receiver, it is passed up from the Internet Layer to the Transport Layer and processed by the TCP. TCP then combines the packets, as appropriate, and passes the combined packets as data to the application layer. However, only those data packets that are in compliance with the sequence mechanism are passed up. For example, if packets with sequence numbers 1, 2 and 5 are received, packets with sequence numbers 1 and 2 are combined and passed up since they are in order and sequence, but the packet with the sequence number 5 is held back since that packet is not in sequence relative to the previous highest ordered packet received, namely the packet with the sequence number 2.

Accordingly, the packet with the sequence number 5 will be sent up to the Application Layer after packets with sequence numbers 3 and 4 are received and processed.

Since packet transfer through a network is not reliable, packets can get lost and not arrive at a receiver. Positive acknowledgment and retransmission mechanisms are used to address reliability of packet transfers. Accordingly, the network component sending the data, the sender, keeps a record of each packet it sends. The network component receiving the data, the receiver, responds with an acknowledgment message as it receives each packet. The sender also keeps a timer for a packet, and starts the timer at the time the packet is sent. The sender retransmits a packet if, based on the timer, a predetermined time lapses before the reception of the acknowledgement message for that packet. The timer is needed in case a packet gets lost or corrupted and thus never reaches the receiver. Continuing with the simplified example, when packets with the sequence numbers 1, 2 and 5 are received at the receiver, an acknowledgement is sent for them. If an acknowledgement is not received for packets with sequence numbers 3 and 4 based on a predetermined time, packets with sequence numbers 3 and 4 will be resent based on the assumption that they are lost (i.e. were never received by the receiver since they were not acknowledged).

Flow control mechanisms are used to address the reliability issue that if the rate of transmission from a sender is too high, the receiver may not be able to process it. According to this mechanism, the receiver continually provides to the sender information on how much data can be received, as controlled, for example, by a sliding window. As an example, when the receiver's data reception buffer fills, the next acknowledgment sent by the receiver can contain an indication of window or packet size such as the value 0, to indicate that data transfer should be stopped to allow the data in the receiver's buffer to be processed. Once sufficient space opens up in the buffer, the acknowledgment sent for the last processed packet can include a value larger than 0 for the window or packet size to start the transfer.

Congestion control mechanisms involve methods such as slow start to control the rate of data entering the network. Acknowledgements for data sent, or lack of acknowledgements, are used by the sender to infer network congestion conditions between it and the receiver, and methods like slow start are used to adjust the communications rate to match the congestion level. For example, according to the slow-start mechanism, initial transmission from the sender starts with a small window or packet size. The window or packet size is increased as the sent packets are acknowledged by the receiver. The growth is stopped when packets get lost as indicated by lack of acknowledgement.

Transport Layer protocols that include reliability mechanisms, namely reliable transport protocols, are useful for transporting data where reliability is important and data loss is highly undesirable. For example, for text based messaging applications such as SMS, IM, email and others, reliability is paramount since receiving the message in its entirety is crucial. Same considerations apply for applications involving document or file transfer. On the other hand, reliable transport protocols are less useful for applications where data loss is not as important, such as audio or video streaming or messaging, online gaming and other multi-media applications. In fact, the use of such protocols for these types of applications can be disadvantageous by introducing additional latency and other transmission issues that are disadvantageous for these types of applications. For these applications, best-effort protocols can be more appropriate.

As an example, User Datagram Protocol is a connectionless datagram protocol. Like IP, it is a best-effort, "unreliable" protocol. UDP is typically used for applications such as streaming media (audio, video, voice over IP and others that will now occur to a person of skill) where on-time arrival is more important than reliability, or for simple query/response applications like DNS lookups, where the overhead of setting up a reliable connection is disproportionately large. Reliability can be partially addressed through error detection mechanisms such as a checksum method, but such a mechanism does not provide the level of reliability that the reliability mechanisms of a reliable transport protocol provides. RTP over UDP is also a transport protocol that is designed for real-time data such as streaming audio and video.

The Application Layer contains the higher-level protocols used by most applications executing on a network component for network communication. Examples of Application Layer protocols include the File Transfer Protocol (FTP), Real Time Messaging protocol (RTMP), and the Simple Mail Transfer Protocol (SMTP). Data coded according to Application Layer protocols are encapsulated into one or (occasionally) more transport layer protocols (such as TCP or UDP), which in turn use lower layer protocols to effect actual data transfer. For example, the Real Time Streaming Protocol (RTSP) is an application-level streaming protocol that can use multiple protocols in the Transport Layer to transmit its packets, including UDP and Transmission Control Protocol (TCP). Sometimes application-level protocols are written specifically for a particular transport protocol, like RTP over UDP.

Application Layer protocols generally treat the Transport Layer (and lower) protocols as black boxes which provide a stable network connection across which to communicate, although the applications are usually aware of certain aspects of the lower layer protocols such as transport addresses.

Turning back to FIG. 2, memory 212 also includes relay module 256. In general, processor 208 is configured, via the execution of relay module 256, to allow relay 116 to relay data between client 104 and a peer 124. In a non-limiting example, relay module 256 implements a relay based on the TURN protocol, namely a TURN server. In this example, relay module 256 calls upon network module 252 to perform network communications such as sending and receiving data.

In order to use the relay services offered by relay 116, client 104 sends and receives communications between its transport address and client transport address on the relay 116. The client 104 can learn the client transport address through a variety of means (for example through a configuration of the client 104), and this address is typically used by many clients simultaneously.

Since client 104 is behind firewall 108, relay 116 sees packets from the client 104 as coming from a transport address on the firewall 108. This address is known as the client 104's server-reflexive transport address; packets sent by relay 116 to the client 104's server-reflexive transport address is forwarded by the firewall 108 to the client 104's transport address.

Client 104 can establish one or more relayed transport addresses at relay 116. The client 104 does this by obtaining one or more IP addresses and ports on relay 116 which are then reserved for client 104. Relayed transport addresses established by client 104 are the transport addresses on the relay 116 that peers 124 can use to have data relayed to the client 104. When a peer 124 sends a packet to a relayed transport address for client 104, relay 116 relays the packet to client 104. When client 104 sends a data packet to relay 116, relay 116 relays it to the appropriate peer 124 using one of client 104's relayed transport addresses as the source.

Establishment and manipulation of relayed transport addresses can be accomplished by creating and maintaining allocations or profiles for the client 104, such as a data structure, on relay 116. An allocation contains, amongst other things, one or more relayed transport addresses reserved for the client 104.

Once an allocation is created, the client 104 can send data from an application running on the client 104, such as a multimedia chat application, to the relay 116 along with an indication of which peer 124 the data is to be sent to. Relay 116 subsequently relays this data to the indicated peer 124. In this example implementation, the client 104, being behind firewall 108 that only allows the reliable protocol TCP, sends and receives application data to the relay 116 using TCP packets. It will now occur to a person of skill that in communicating with relay 116, other reliable protocols, such as secure protocols such as TLS over TCP can be also used. Given that the example application used is a multi-media application, at the relay 116, the data is processed and sent to a peer 124 based on an unreliable, best-effort UDP datagram. It will now occur to a person of skill that in communicating with relay 116, other unreliable or best effort protocols, such as RTP over UDP, can be also used. In the reverse direction, a peer 124 sends application data in UDP datagrams to the relayed transport address for the client 104. Relay 116 then processes the data and sends it to the client along with an indication of which peer 124 sent the data using TCP packets.

Based on the example configuration of system 100 as indicated in FIG. 1, client 104 communicates with relay 116 using the TCP protocol. Relay 116 communicates with peers 124 using the UDP protocol (it is assumed that peer 124 can receive UDP traffic through firewall 120). Accordingly, relay 116, in effect, performs protocol translation as well as relay functions. In some implementations, relay 116 can utilize a modified reliable transport protocol to improve communication characteristics with client 104 with regards to real-time multimedia applications and other applications with similar communications characteristics. The modified transport protocol can take the form of the modified TCP described below. It will now occur to a person of skill in the art that in variations of other reliable protocols, unreliable protocols and modified reliable protocols can be used.

As discussed above, a reliable protocol such as TCP is disadvantageous for certain applications that may be executing on client 104, such as voice messaging or video messaging applications. In these cases, the use of TCP can lead to added latency and other issues that arise from reliability mechanisms used to make TCP a reliable transport. However, UDP or RTP over UDP cannot be used since firewall 108 blocks those transports. Accordingly a modified reliable transport protocol such as a modified TCP can be employed on server 116 for communications with client 104.

The modifications to a reliable protocol allow it to be compatible with its unmodified version, such as TCP, while alleviating some of the disadvantages associated with the use of real-time multi-media applications such as a streaming video application or a video-chat application by modifying some of the reliability mechanisms. The compatibility enables relay 116 to communicate using the modified transport protocol with the client 104 that is using an unmodified transport protocol. Because the modified reliable protocol is compatible with the reliable protocol from which it was derived, relay 116 can communicate with any network component behind the firewall 108 using the modifications since no modifications are needed to be performed on network components besides relay 116.

The modifications can be achieved by making alterations to network module 252 such that the implementation of the transport layer is altered to give effect to the modifications to the reliability mechanisms for example. In one implementation, all data destined to client 104 would be relayed using the modified protocol. In other implementations, both the modified and the unmodified versions of the reliable protocol can be maintained on the relay 116, by for example maintaining two versions of network module 252, or by modularizing network module 252 such that it can access different versions of the transport protocol as needed. The relay can utilize the modified protocol for certain types of data communications such as communications involving multi-media chats or streaming and others where latency affects communications quality. For other types of applications, such as email, the unmodified reliable protocol can be used. The type of protocol to be used can be determined by deep packet analysis, through communications from client 104, port numbers used for communication or other methods that will now occur to a person of skill in the art. In other variations, the modified reliable protocol can be used when the communications with a peer is based on an unreliable protocol such as UDP or RTP over UDP. Other methods of determining when to use a modified protocol will now occur to a person of skill in the art.

Modifications typically involve modifications to the reliability mechanisms such as the sequencing mechanisms, acknowledgement and retransmission mechanisms and others. In one implementation, a received packet that is not in sequence can be passed up to the Application Layer to be processed and relayed by the relay application 256 in contradiction with the sequencing mechanisms of TCP. Accordingly, if a frame or a portion of a frame of a video being streamed is delayed, the rest of the transmission is not delayed in order to receive the delayed frame or portion. In variations, when the packets prior in sequence to the out of sequence packet are received (after the out of sequence packet is already passed up to the Application Layer) they are also passed up to the Application Layer.

Retransmission and acknowledgement mechanisms can also be modified. Accordingly, relay 116 can send an acknowledgement message not just for an out of sequence packet, but for all the unreceived intervening packets between it and the previously received message that was acknowledged, as determined based on the sequence. Accordingly, based on the simplified example above, when relay 116 receives packets with sequence numbers 1, 2 and 5 in that order, relay 116 would send an acknowledgement for not just those packets but also for the intervening packets with sequence numbers 3 and 4, even though packets with sequence numbers 3 and 4 were never received, preventing their retransmission in contradiction with the retransmission and acknowledgement reliability mechanisms. In variations, if packets 3 and 4 are received after they are acknowledged, they are still processed and passed up to the Application Layer.

Additionally, relay 116, using the modified protocol can generate periodic acknowledgements to prevent retransmission of stale data, once again in contradiction with the acknowledgement and retransmission reliability mechanisms. For example, at each interval of a predetermined period, relay 116 can send an acknowledgement message to the client 104 despite having not received a packet at that time. Which packet or packets to acknowledge at each time period can be based on various methods. For example, relay 116 can track the average number of packets received at each time period and acknowledge all of those packets that ought to have been received based on the average number, acknowledging even those packets that were not received. For example, if relay 116 determines that 50 packets are received every 10 milliseconds on average, then every 10 milliseconds, relay 116 would count up 50 packets from the packet with the highest sequence number that was last acknowledged based on the periodic acknowledgement, and acknowledge all packets that fall in that sequence range that were not already acknowledged, whether they were received or not. Accordingly, if the highest numbered packet to have been acknowledged during the last periodic acknowledgement at 2 seconds had sequence number 1000, at 2.01 seconds, packets with sequence numbers 1001 through 1050 would be acknowledged. In one implementation, if some of those packets were already received and acknowledged, only the ones that were not received and acknowledged, are acknowledged. In other implementations, the determination of the packets to acknowledge at periodic intervals can be based on the type of data being relayed. For example, if the data being relayed is a video stream, the periodic acknowledgements can be timed with each frame of the video such that any data packets belonging to a video frame is acknowledged at the end of the time period when the video frame ought to have been received, thus preventing retransmission of stale data such as data for frames that have already been processed. The type of data being relayed can be determined from deep packet inspection, can be communicated by the client 104 or a peer 124, or through other mechanisms that will now occur to a person of skill in the art.

In other implementations, packets being sent from client 104 to relay 116 can also be based on the modified transport protocol. For example, in one implementation, modified transport protocol can bypass the use of slow-start and transmit at high data rates immediately. The transmission rate chosen can be based on the requirements of the communications. For example, for a video chat application, the rate chosen can be that which allows video and audio to be transmitted at or near the bandwidths required for the application, the audio quality chosen, video resolution and frame rate. The initial rate can also be adjusted on the basis of network characteristics such as bandwidth available, type of connection for client 104 or relay 116 (wireless, wired, cellular), requirements of the firewall 108 and others that will now occur to a person of skill in the art.

Figure 3:
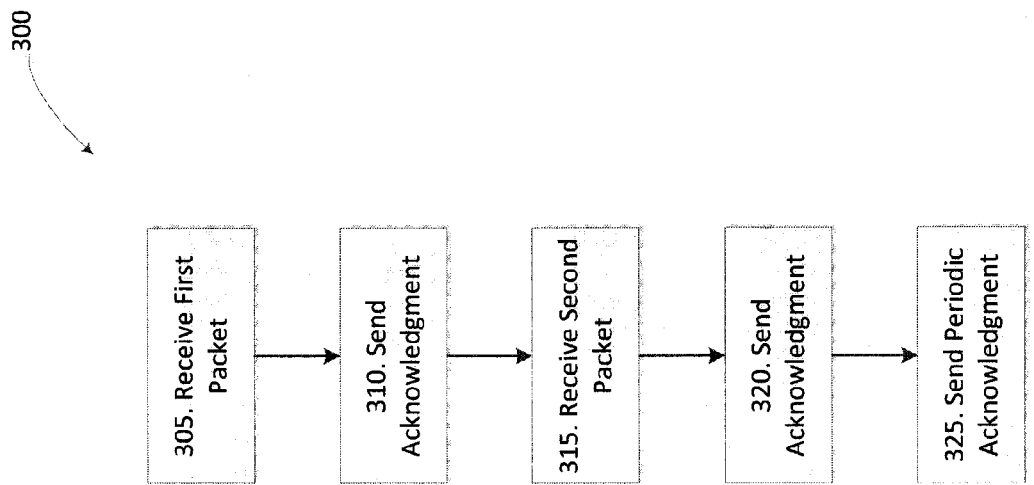
FIG. 3 shows a flow chart indicating a method of relaying data based on a modified reliable transport protocol.

Referring now to FIG. 3, a method relaying data based on a modified reliable transport protocol is indicated at 300. In order to assist in the explanation of the method, it will be assumed that method 300 is operated using system 100 as shown in FIG. 1. Additionally, the following discussion of method 300 leads to further understanding of system 100. However, it is to be understood that system 100, and method 300 can be varied, and need not work exactly as discussed herein in conjunction with each other, and that such variations are within scope.

At 305 a first packet is received at relay 116. The packet is received from the physical network by the Link Layer, and passed up, through IP layer to the modified TCP protocol. It will be assumed for this example that the sequence number of the packet is 1000 and that it was sent from client 104.

Continuing with method 300 at 310 an acknowledgement message is sent in accordance with the TCP protocol and the acknowledgement and retransmission mechanisms. The acknowledgement message is sent to client 104 by relay 116 to acknowledge the reception of the packet with the sequence number 1000. At this point, it is assumed that the packet is also sent up to the Application Layer for relaying to a peer using UDP, although in variations, the packet can be held for a period to be combined with other received packets that are adjacent in the sequence before providing it to the Application Layer.

At 315 a second packet is received at relay 116. The packet is received from the physical network by the Link Layer, and passed up, through IP layer to the modified TCP protocol. It will be assumed for this example that the sequence number of the packet is 1050 and that it was sent from client 104.

Continuing with method 300 at 320 an acknowledgement message is sent in accordance with the TCP protocol. The acknowledgement message is sent to client 104 by relay 116 to acknowledge the reception of packet with the sequence number 1050. Additionally, acknowledgement is sent for packets with sequence numbers between 1001 through 1049.

At this point, the packet with the sequence number 1050 is also sent up to the Application Layer for relaying to a peer using UDP.

At 325 a periodic acknowledgement is sent. It is assumed that a specified period is expired, which for this example will be assumed to be 100 milliseconds. Accordingly, relay 116 sends a periodic acknowledgement every 100 milliseconds based on a historical rate of packets received, which in this case will be assumed to be 100 packets for every 100 milliseconds. It is assumed that the last packet to have been acknowledged at the last periodic acknowledgement point 100 milliseconds prior to the current periodic acknowledgement point was the packet with the sequence number 975. Accordingly, packets with sequence numbers 976 through 1075 are acknowledged at this periodic acknowledgement point. However, since in this example, packets with sequence numbers up to 1050 have already been acknowledged, only packets with the sequence numbers 1051 through 1075 are acknowledged.

In variations, the number of packets acknowledged can vary at each periodic acknowledgement point based on varying historical rate. Alternatively, the number of packets acknowledged can be a constant. In other variations, the number of packets acknowledged can be set based on overall communications capacity or other network characteristic.

Figure 4:
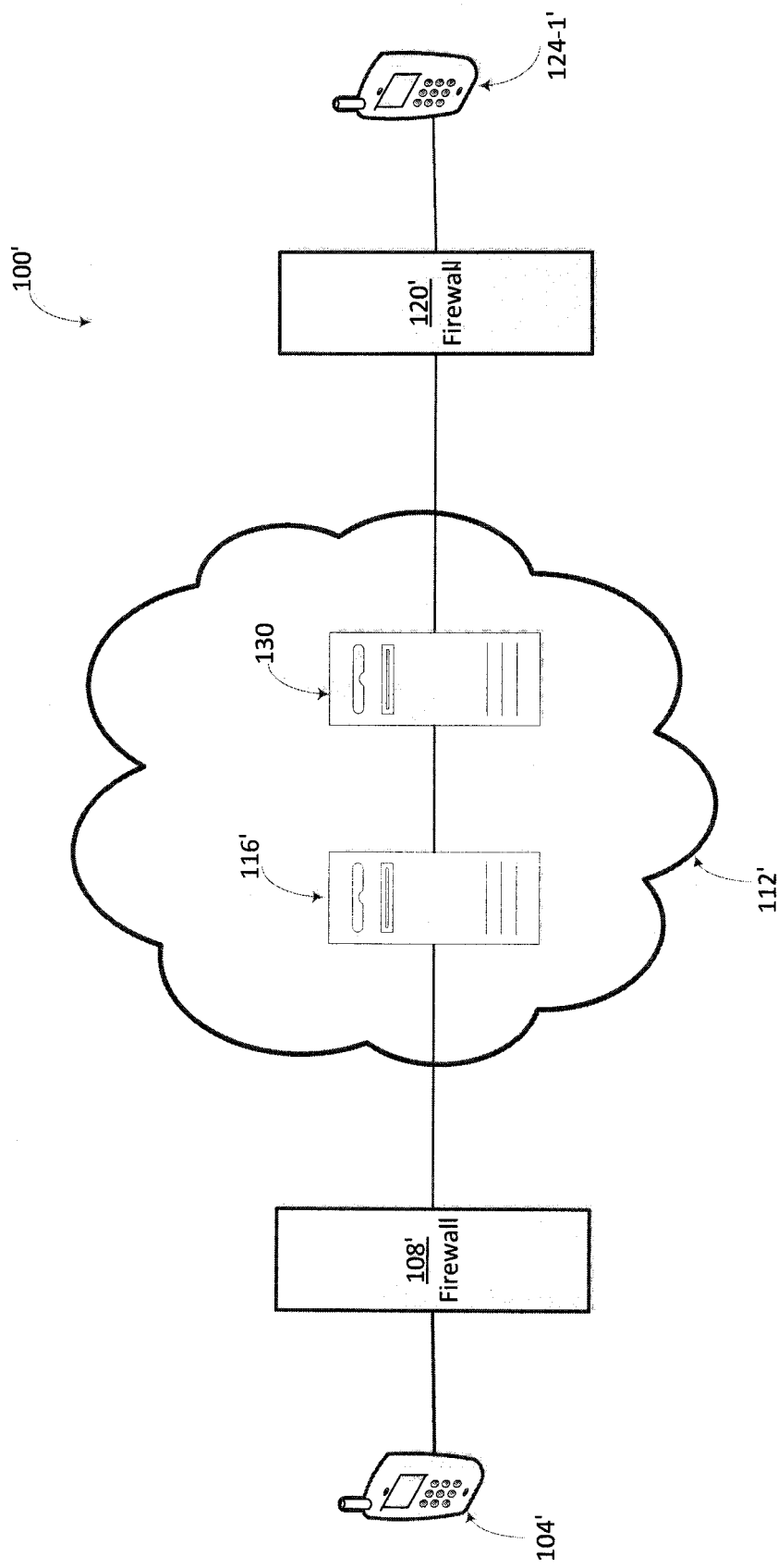
FIG. 4 shows a block diagram of another aspect of a system for relaying data based on a modified reliable transport protocol.

In a variation, as shown in FIG. 4, a peer 124 that is behind a firewall can itself be communicating through a relay as well. FIG. 4 depicts a communications system 100'. Components of system 100' are similar to the similarly numbered components of system 100. System 100' includes a client 104', which in the present example, similar to client 104 of system 100, is a network component based on the computing environment and functionality of a hand-held wireless client. Client 104' is not limited to a hand-held wireless client, however. Other devices are also contemplated, such as cellular telephones, smart telephones, Personal Digital Assistants ("PDAs"), media (e.g. MP3) players, laptop computers, tablet computers and the like. In other examples, client 104' can be a computing device such as a desktop computer, an embedded computer, a server or other computing device.

Client 104' is connected to network 112' through a firewall 108'. Network 112' is a publicly available network such as the internet or other wide area network (WAN). Other network types will now occur to a person of skill. Accordingly, the connection allows client 104' to perform multi-media and other data and voice communications with other network components including other devices such as a peer 124-1' via network 112'. Peer 124-1', similar to peer 124-1 of system 100, is a handheld client, but is not limited to such devices. Other devices are also contemplated, such as cellular telephones, smart telephones, Personal Digital Assistants ("PDAs"), media (e.g. MP3) players, laptop computers, tablet computers and the like. In other examples, a peer can be a computing device such as a desktop computer, an embedded computer, a server or other computing device. Peer 124-1' is located behind firewall 120', similarly to system 100.

Firewall 108' and 120', similar to firewall 108 and 120 of system 100, are security components that control traffic that is reachable to client 104 through various mechanisms, therefore assisting in the prevention of unsecure and untrusted communications from reaching client 104' and peer 124-1' respectively. Firewall 108' and 120' also have (NAT) functionality. Another functionality of a firewall 108' and 120' is to filter the types of communications protocols that can be used to access devices and network elements behind the firewall. In the present non-limiting example, it will be assumed that firewall 108' and 120' only allow communications based on the Transport Control Protocol (TCP).

When a direct communication path cannot be found between client 104' and peer 124-1', services of an intermediate host that acts as a relay for the communications, such as relay 116' and 130 can be used. A relay typically sits in a public network such as network 112' and relays packets between a client and a peer. A relay protocol such as TURN can be used which can allow a relay 116' to act as a relay for communications to and from client 104'. Accordingly, client 104' can arrange for relay 116' to relay packets to and from peer 124-1' and can control aspects of how the relaying is done. A relay 116' can be implemented as hardware and/or software. A relay protocol such as TURN can also be used to allow relay 130 to act as a relay for communications to and from peer 124-1'. Accordingly, peer 124-1' can arrange for relay 130 to relay packets to and from client 104' and can control aspects of how the relaying is done. A relay 130 can be implemented as hardware and/or software.

Based on the configuration of system 100', in one implementation, client 104' communicates with relay 116' using the TCP protocol. Relay 116' communicates with Relay 130 using the UDP protocol. Peer 124-1' communicates with relay 130 using, once again, the TCP protocol. Accordingly, the relays 130 and 116' perform protocol translation as well as relay functions. In some implementations, relay 116' and relay 130 can utilize a modified transport protocol to improve communication characteristics with client 104' and peer 124-1' respectively. The modified transport protocol can take the form of the modified TCP described above. Accordingly, method 300 can be operated using system 100' as shown in FIG. 4. However, it is to be understood that system 100', and method 300 can be varied, and need not work exactly as discussed herein in conjunction with each other, and that such variations are within scope. In particular method 300 can illustrate the functionality of both relay 116' or 130, but in the case of relay 130, the communications using the modified protocol referred to in method 300 are with peer 124-1' rather than client 104'. It will now occur to a person of skill in the art that modified transport protocols can apply to communications between a relay and a network component where the communications use a reliable transport protocol.

The above-described implementations are intended to be examples and alterations and modifications may be effected thereto, by those of skill in the art, without departing from the scope which is defined solely by the claims appended hereto.

We claim:

1. A method comprising:
at a relay comprising a processor operably interconnected with a network interface, receiving, at the processor using the network interface, data communicated in accordance with a reliable transport protocol; and
processing, at the processor, said data in accordance with a modified reliable transport protocol, said modified reliable transport protocol being based on and being compatible with said reliable protocol, said processing occurring by:
tracking an average number of packets of the data received at each of predetermined time periods, wherein the average number comprises a number of the packets received within each of the predetermined time periods, on average; and,
for each of the predetermined time periods:
counting the number of packets received up to the average number, the counting starting from a packet with a highest sequence number that was last acknowledged in a previous predetermined time period; and
sending, using the network interface, an acknowledgment message for all packets that fall in that sequence range that were not already acknowledged, and that ought to have been within a predetermined time period based on the average such that even those packets that were not received with the predetermined time period are acknowledged.

2. The method of claim 1 wherein the reliable protocol includes reliability mechanisms and modified reliable transport protocol includes modified reliability mechanisms, said modified reliability mechanisms being based on said reliability mechanisms.

3. The method of claim 1 wherein said receiving data comprises receiving a first packet and subsequently a second packet, said first packet and second packet generated based on a sequence, and wherein said processing comprises processing said second packet in accordance with said modified reliability mechanisms.

4. The method of claim 3 wherein said sequence includes intervening packets between said first packet and said second packet.

5. The method of claim 4 wherein said processing of said second packet includes relaying said second packet prior to receiving said intervening packets.

6. The method of claim 5 wherein said processing said second packet includes sending an acknowledgement of said second packet and said intervening packets prior to receiving said intervening packets.

7. The method of claim 5 wherein processing said second packet includes passing up said second packet to the Application Layer prior to receiving said intervening packets.

8. The method of claim 1 wherein said number of packets acknowledged is further based on a characteristic of said data.

9. The method of claim 3 wherein said method further comprises:
relaying said second packet using an unreliable transport protocol.

10. The method of claim 9 wherein said reliable transport protocol is Transport Control Protocol (TCP).

11. The method of claim 10 wherein said relaying is based on the Traversal Using Relays around NAT (TURN) protocol.

12. The method of claim 11 wherein said unreliable transport protocol is one of User Datagram Protocol (UDP) or Real-time Transport Protocol (RTP) over UDP.

13. The method of claim 5 wherein said receiving data further comprises receiving said intervening packets and said processing further comprises relaying said intervening packets after relaying said second packet.

14. A server comprising:
a processor;
a network interface operably connected to said processor;
said processor configured for:
receiving data, through said network interface, said data communicated in accordance with a reliable transport protocol;
processing said data in accordance with a modified reliable transport protocol, said modified reliable transport protocol being based on and being compatible with said reliable protocol, said processing occurring by:
tracking an average number of packets of the data received at each of predetermined time periods, wherein the average number comprises a number of the packets received within each of the predetermined time periods, on average; and, for each of the predetermined time periods:
  counting the number of packets received up to the average number, the counting starting from a packet with a highest sequence number that was last acknowledged in a previous predetermined time period; and
  sending, using the network interface, an acknowledgment message for all packets that fall in that sequence range that were not already acknowledged, and that ought to have been received within a predetermined time period based on the average number, such that even those packets that were not received with the predetermined time period are acknowledged.

15. The server of claim 14 wherein the reliable protocol includes reliability mechanisms and modified reliable transport protocol includes modified reliability mechanisms, said modified reliability mechanisms being based on said reliability mechanisms.

16. The server of claim 15 wherein said receiving data comprises receiving, through said network interface, a first packet and subsequently a second packet generated based on a sequence, and wherein said processing comprises processing said second packet in accordance with said modified reliability mechanisms.

17. The server of claim 16 wherein said sequence includes intervening packets between said first packet and said second packet, and wherein said processing of said second packet includes relaying, through said network interface, said second packet prior to receiving said intervening packets.

18. A non-transitory computer-readable medium storing a computer program, wherein execution of the computer program is for:
  at a relay comprising a processor operably interconnected with a network interface, receiving, at the processor using the network interface, data communicated in accordance with a reliable transport protocol; and
  processing, at the processor, said data in accordance with a modified reliable transport protocol, said modified reliable transport protocol being based on and being compatible with said reliable protocol, said processing occurring by:
    tracking an average number of packets of the data received at each of predetermined time periods, wherein the average number comprises a number of the packets received within each of the predetermined time periods, on average; and,
    for each of the predetermined time periods:
      counting the number of packets received up to the average number, the counting starting from a packet with a highest sequence number that was last acknowledged in a previous predetermined time period; and
      sending, using the network interface, an acknowledgment message for all packets that fall in that sequence range that were not already acknowledged, and that ought to have been received within a predetermined time period based on the average number, such that even those packets that were not received with the predetermined time period are acknowledged.

* * * * *

UNITED STATES PATENT AND TRADEMARK OFFICE
CERTIFICATE OF CORRECTION

| | | |
|---|---|---|
| PATENT NO. | : 9,282,172 B2 | Page 1 of 1 |
| APPLICATION NO. | : 13/891694 | |
| DATED | : March 8, 2016 | |
| INVENTOR(S) | : Scott Peter Gammon et al. | |

It is certified that error appears in the above-identified patent and that said Letters Patent is hereby corrected as shown below:

In the Claims

Column 14, line 7, claim 1: insert --received-- after "been"

Column 14, line 8, claim 1: insert --number-- after "average"

Signed and Sealed this
Nineteenth Day of July, 2016

Michelle K. Lee
*Director of the United States Patent and Trademark Office*